US009317259B2

(12) United States Patent
Chandrasekharan et al.

(10) Patent No.: US 9,317,259 B2
(45) Date of Patent: Apr. 19, 2016

(54) APPARATUS, SYSTEM, AND METHOD FOR AUTOMATICALLY GENERATING A REUSABLE SOFTWARE COMPONENT FOR INTERFACING WITH A WEB SERVICE

(75) Inventors: Sivakumar Chandrasekharan, Alameda, CA (US); Sujee Sivasubramaniyam, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 1855 days.

(21) Appl. No.: 11/128,068

(22) Filed: May 12, 2005

(65) Prior Publication Data

US 2006/0271537 A1    Nov. 30, 2006

(51) Int. Cl.
*G06F 15/16* (2006.01)
*G06F 9/44* (2006.01)

(52) U.S. Cl.
CPC ........................................ *G06F 8/36* (2013.01)

(58) Field of Classification Search
USPC .......................................... 709/203; 719/316
See application file for complete search history.

(56) References Cited

U.S. PATENT DOCUMENTS

| | | | | |
|---|---|---|---|---|
| 6,108,696 | A * | 8/2000 | Mendhekar et al. | 709/217 |
| 6,665,634 | B2 * | 12/2003 | Taft et al. | 702/186 |
| 6,769,095 | B1 | 7/2004 | Brassard et al. | 715/513 |
| 7,000,238 | B2 * | 2/2006 | Nadler et al. | 719/330 |
| 7,028,223 | B1 * | 4/2006 | Kolawa et al. | 714/38.14 |
| 7,117,504 | B2 * | 10/2006 | Smith et al. | 719/328 |
| 7,191,160 | B2 * | 3/2007 | Hoeft et al. | 706/12 |
| 7,360,120 | B2 * | 4/2008 | De Pauw et al. | 714/45 |
| 7,376,959 | B2 | 5/2008 | Warshavsky et al. | |
| 7,490,314 | B2 * | 2/2009 | Yuknewicz et al. | 717/105 |
| 7,607,136 | B2 * | 10/2009 | Kuno et al. | 719/315 |
| 7,620,934 | B2 * | 11/2009 | Falter et al. | 717/106 |
| 7,694,140 | B1 * | 4/2010 | Sachenko et al. | 713/170 |
| 7,805,735 | B2 | 9/2010 | Shenfield et al. | |

(Continued)

FOREIGN PATENT DOCUMENTS

EP    1569418 A1 *  8/2005  ............. H04L 29/08

OTHER PUBLICATIONS

"UDDI Overview Web Services Registry"; www.uddi.orq/whitepapers.html.

(Continued)

*Primary Examiner* — Hua Fan
(74) *Attorney, Agent, or Firm* — Kunzler Law Group

(57) ABSTRACT

An apparatus, system, and method are disclosed for automatically generating a reusable software component for interfacing with a web service. The apparatus for automatically generating a reusable software component for interfacing with a web service is provided with a logic unit containing a plurality of module configured to functionally execute the steps of receiving a web service identifier, establishing communication with a web service, determining one or more functions provided by the web service, and automatically generating a reusable web service component configured to receive an application request and return a web service result. These modules in the described embodiments include a receiving module, a determination module, a communication module, and a generation module. Beneficially, such an apparatus, system, and method would facilitate creation, test, and integration of web service components in application code without requiring a substantial time and resource investment.

19 Claims, 7 Drawing Sheets

(56) References Cited

U.S. PATENT DOCUMENTS

| | | | | |
|---|---|---|---|---|
| 2002/0066033 A1* | 5/2002 | Dobbins et al. | | 713/201 |
| 2002/0077930 A1* | 6/2002 | Trubey et al. | | 705/26 |
| 2002/0116454 A1* | 8/2002 | Dyla et al. | | 709/203 |
| 2002/0178186 A1* | 11/2002 | Parry | | 707/513 |
| 2002/0186248 A1 | 12/2002 | Ramanathan et al. | | 345/780 |
| 2002/0198616 A1 | 12/2002 | Crampton et al. | | 700/99 |
| 2003/0004746 A1* | 1/2003 | Kheirolomoom et al. | | 705/1 |
| 2003/0005114 A1* | 1/2003 | Shavit et al. | | 709/225 |
| 2003/0005412 A1* | 1/2003 | Eanes | | 717/120 |
| 2003/0028364 A1* | 2/2003 | Chan et al. | | 704/1 |
| 2003/0070006 A1* | 4/2003 | Nadler et al. | | 709/330 |
| 2003/0074423 A1* | 4/2003 | Mayberry et al. | | 709/219 |
| 2003/0105884 A1* | 6/2003 | Upton | | 709/318 |
| 2003/0120464 A1* | 6/2003 | Taft et al. | | 702/186 |
| 2003/0217044 A1* | 11/2003 | Zhang et al. | | 707/3 |
| 2003/0229665 A1* | 12/2003 | Ryman | | 709/203 |
| 2004/0003033 A1* | 1/2004 | Kamen et al. | | 709/203 |
| 2004/0017392 A1* | 1/2004 | Welch | | 345/738 |
| 2004/0039964 A1* | 2/2004 | Russell et al. | | 714/25 |
| 2004/0064503 A1 | 4/2004 | Karakashian et al. | | |
| 2004/0068554 A1 | 4/2004 | Bales et al. | | 709/218 |
| 2004/0088352 A1 | 5/2004 | Kurth | | 709/203 |
| 2004/0103144 A1* | 5/2004 | Sallam et al. | | 709/203 |
| 2004/0111464 A1* | 6/2004 | Ho et al. | | 709/203 |
| 2004/0117759 A1* | 6/2004 | Rippert et al. | | 717/100 |
| 2004/0148370 A1 | 7/2004 | Sadiq | | 709/223 |
| 2004/0162741 A1 | 8/2004 | Flaxer et al. | | 705/7 |
| 2004/0181665 A1 | 9/2004 | Houser | | 713/158 |
| 2004/0193635 A1 | 9/2004 | Hsu et al. | | 707/102 |
| 2004/0193703 A1* | 9/2004 | Loewy et al. | | 709/220 |
| 2004/0194064 A1* | 9/2004 | Ranjan et al. | | 717/124 |
| 2004/0199896 A1 | 10/2004 | Goodman et al. | | 717/100 |
| 2004/0254945 A1* | 12/2004 | Schmidt et al. | | 707/100 |
| 2005/0044197 A1* | 2/2005 | Lai | | 709/223 |
| 2005/0144557 A1* | 6/2005 | Li et al. | | 715/513 |
| 2005/0154939 A1* | 7/2005 | De Pauw et al. | | 714/25 |
| 2005/0203938 A1* | 9/2005 | Hoeft et al. | | 707/102 |
| 2005/0278348 A1* | 12/2005 | Falter et al. | | 707/100 |
| 2006/0036941 A1* | 2/2006 | Neil | | 715/526 |
| 2006/0111880 A1* | 5/2006 | Brown et al. | | 703/1 |
| 2006/0112398 A1* | 5/2006 | Mukkamala et al. | | 719/316 |
| 2006/0156277 A1* | 7/2006 | Gupta et al. | | 717/104 |
| 2006/0206856 A1* | 9/2006 | Breeden et al. | | 717/101 |
| 2006/0212857 A1* | 9/2006 | Neumann et al. | | 717/140 |
| 2006/0248506 A1* | 11/2006 | Luo et al. | | 717/104 |
| 2008/0086564 A1* | 4/2008 | Putman et al. | | 709/227 |
| 2009/0013310 A1* | 1/2009 | Arner et al. | | 717/120 |
| 2010/0318974 A1* | 12/2010 | Hrastnik et al. | | 717/135 |

OTHER PUBLICATIONS

"UDDI Executive Overview"; www.uddi.org/whitepapers.html.
"Web Service Definition Language"; http://www.w3.org/TR/wsdl.
"Java Web Services Developer Pack". http://java.sun.com/webservices/jwsdp/index.jsp.

* cited by examiner

APPARATUS, SYSTEM, AND METHOD FOR AUTOMATICALLY GENERATING A REUSABLE SOFTWARE COMPONENT FOR INTERFACING WITH A WEB SERVICE

BACKGROUND OF THE INVENTION

1. Field of the Invention

This invention relates to object oriented software programming and more particularly relates to automatically generating a reusable software component for interfacing with a web service.

2. Description of the Related Art

A web service, as commonly referred to in the art of software programming, is an application or module of code that is accessible over the internet using Hyper Text Transfer Protocol ("HTTP"), Extensible Markup Language ("XML"), or other data transfer protocols and data formats. Web services are often provided by companies or business entities to facilitate business transactions over the internet. For example Amazon™ provides the Amazon Web Service ("AWS") to allow software developers to incorporate access to the Amazon™ database in their web applications. Additionally, the AWS provides services to facilitate purchasing of Amazon™ products over the internet from separate and distinct web applications.

Web services may be written in various software languages and use a Web Service Description Language ("WSDL") which has been standardized for commonality and interoperability to describe the web service. WSDL is an XML syntax format for describing network services as a group of communication endpoints exchanging messages containing data and commands. Using WSDL, a web service can be utilized as a "black box" with one or more input ports and one or more output ports. For example, an application accessing the web service provides a message containing a command and/or data, and receives a message containing the data or commands resulting from the web service request. The web service application code used to perform background operations may include JAVA, C, C++, or the like. However, since web applications use XML, or WSDL, to request access to the web service, the language format of the background code is irrelevant.

The ports of a web service typically include some specific formatting requirements. A port of a web service requires data or commands of a specific data type. For example, a web service for providing a current temperature by city would include an input port and an output port. The input port may require a character string representing the city name, and the output port returns an integer representing the temperature in that city.

Web services employ standardized XML format to allow software application developers to access the web services from a variety of applications. Typically, web applications access web services, because access to the web service generally requires a data transfer protocol such as HTTP. One common language for web application code is JAVA. A JAVA developer, for example, must write JAVA application code to translate for accessing the web service.

The translation code typically assigns input arguments from the JAVA code to XML formatted arguments for the web service ports. Additionally, the translation code converts the resulting messages from XML format back to JAVA format. Another function of the translation code is invoking and operation of the web service. Web services typically require instructions for invoking the service or one of the subsets of services provided. For example, a library application may include a translation code to access Amazon™ to allow a user to order a book that is not available in the library.

Adding web service access to an application requires the application developer to take several preparatory steps. The software developer must find the Uniform Resource Locator ("URL") associated with the web service, establish access to the web service, determine the input and output arguments of the web service and the associated data formats, optionally test the web service, determine the required arguments and data types of the requesting application, and write the code required to implement web service access. Each of these steps may be time consuming, error prone, mundane, distracting, and may require additional skills.

Finding a web service URL is often time consuming. A developer can perform a web search using a search engine to find the desired web service provider. Alternatively, if the web service provider is known, the developer may find a link to the web service on the provider's web page. Another solution includes performing a search of a Universal Description, Discovery, and Integration ("UDDI") registry of web services. However UDDI search services such as OASIS™ may require user registration which requires an additional investment of time and possibly increased cost.

Testing of integrated web services generally requires a complete launch of the application accessing the web service, or the creation of a separate and distinct testing harness code. Such a test harness code is typically written independent of the application, and takes a significant time investment to develop.

Furthermore, each of the activities described above with relation to integration of web service access code in an application may require technical skills beyond those required for one of ordinary skill in the art of software design to develop a software application. As described above, accessing web services requires knowledge of XML, the UDDI system, and web service operation and formatting. Additionally, these activities divert energy and attention away from the task of application development and consume substantial portions of development time.

From the foregoing discussion, it should be apparent that a need exists for an apparatus, system, and method that automatically generate a reusable software component for interfacing with a web service. Beneficially, such an apparatus, system, and method would facilitate creation, testing, and integration of web service components in application code without requiring a substantial time and resource investment.

SUMMARY OF THE INVENTION

The present invention has been developed in response to the present state of the art, and in particular, in response to the problems and needs in the art that have not yet been fully solved by currently available software development utilities. Accordingly, the present invention has been developed to provide an apparatus, system, and method for automatically generating a reusable software component for interfacing with a web service that overcome many or all of the above-discussed shortcomings in the art.

The apparatus for automatically generating a reusable software component for interfacing with a web service is provided with a logic unit containing a plurality of module configured to functionally execute the necessary operations for automatically generating a reusable software component for interfacing with a web service. These modules in the described embodiments include a receiving module, a determination module, a communication module, and a generation module. Further embodiments include a convert module, a search module, a storage module, a display module, a presentation module, a test module, and an integration module.

A system of the present invention is also presented for automatically generating a reusable software component for interfacing with a web service. In one embodiment, the system includes a computer network configured to provide data communication between a web service server and a web service utility, a serve connected to the computer network and configured to host a web service, and a web service utility configured to automatically generate a reusable software component for interfacing with a web service.

A signal bearing medium is also presented for automatically generating a reusable software component for interfacing with a web service. In one embodiment, the signal bearing medium tangibly embodies a program of machine-readable instructions executable by a digital processing apparatus to perform the operations of receiving a web service identifier, determining one or more functions provided by the web service, and automatically generating a reusable web service component configured to receive an application request and return a web service result.

In a further embodiment, the signal bearing medium may include instructions to determine an interface of an identified web service. The instructions may also include searching for a Universal Resource Locator (URL) address for a web service identified by a user. In another embodiment, the instructions may include storing a library of selectable web service components configured to integrate with application code.

In one embodiment, the instructions include displaying a graphical development interface configured to facilitate mapping arguments of the reusable web service component to arguments of application code. The instructions may additionally include an operation to present required input values and resulting output values for the reusable web service component to a user.

Additionally, the instructions may include an operation to test a reusable web service component, and an operation to integrate the reusable web service component into an application code. The reusable web service component may be configured to accept input parameters from an application requesting use of a web service, generate web service commands in a format compatible with the web service, invoke the web service to perform a requested function, receive a web service result from the requested function, convert the web service result into a format compatible with the application, and assign the web service result to an output parameter for the requesting application.

A service method is also presented for automatically generating a reusable web service interface component for a customer. The method includes receiving a web service identifier from a customer, using a web service utility to automatically generate a reusable web service component, and delivering the reusable web service component to the customer.

In one embodiment, using the web service utility includes using the web service utility to perform the steps described in relation to the signal bearing medium above. In a further embodiment, the service method includes receiving an application code language identifier from the customer. The method may additionally include integrating the reusable web service component into a set of application code provided by the customer.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
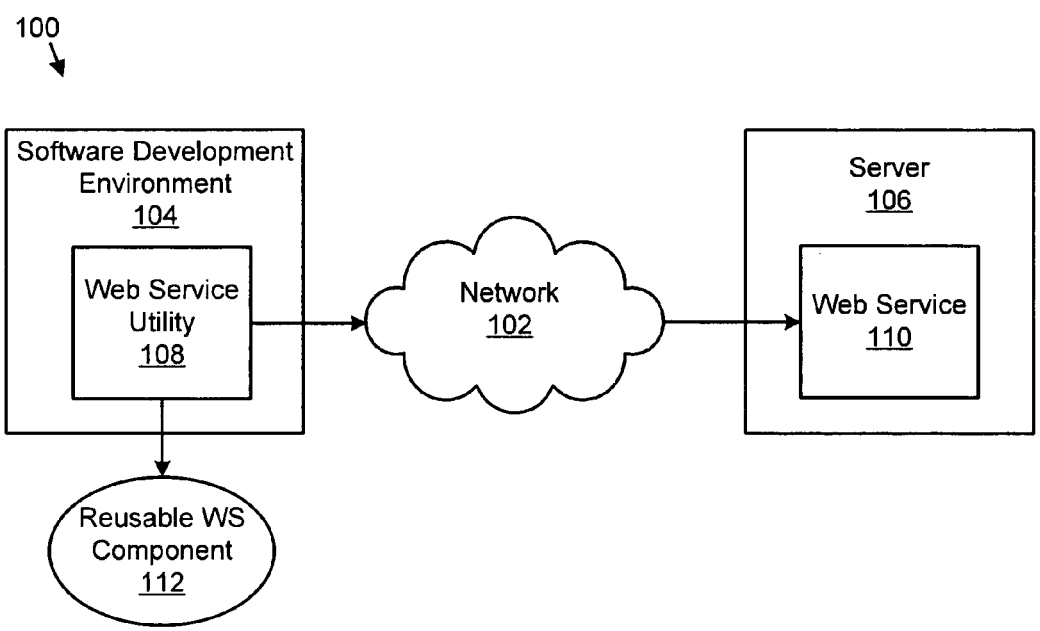
FIG. 1 is a schematic block diagram illustrating one embodiment of a system for automatically generating a reusable software component for interfacing with a web service.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a compact disk, digital-video disk, a magnetic tape, a Bernoulli drive, a magnetic disk, a punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein, the term "web service utility" refers to a method, apparatus, set of programmed computer instructions, or software application used to automatically generate a reusable software component for interfacing with a web service. As used herein, the term "component" refers to a pluggable software module, function, method, or set of instructions configured to integrate with application code in a procedural or object oriented application programming language.

FIG. 1 illustrates one embodiment of a system 100 for automatically generating a reusable software component for interfacing with a web service. In one embodiment, the system 100 includes a computer network 102, a software development environment 104 and a server 106. The software development environment 104 may additionally include a web service utility 108, and the server 106 may additionally include a web service 110. In one embodiment, the web service utility 108 automatically generates a reusable web service component 112.

In one embodiment, the system 100 includes a computer network 102 configured to provide data communication between a server 106 hosting a web service 110, and a web service utility 108. In one embodiment, the computer network 102 may include a connection through the Internet. For example, a URL address, IP address, or the like may be assigned to the server 106 hosting the web service 110. In another example, the URL address may resolve specifically to the web service 110 hosted by the server 106, to provide direct access to the web service 110.

In one embodiment, the system 100 includes a server 106 connected to the computer network 102 and configured to host a web service 110. In one embodiment, the server 106 may be dedicated specifically for management of the web service 110, and related operations. The server 106 may include high bandwidth or multiple connections to the network 102 for high accessibility. Additionally, the server may include one or more processors, one or more storage disks, an operating system, and the like. For example, the server may be an International Business Machines® ("IBM") Enterprise Server.

In one embodiment, the system 100 may include a software development environment 104 which utilizes a web service utility 108. In one embodiment, the software development environment may be used to develop software applications. The software applications may be written in software development languages such as JAVA, .NET, C, C++, Basic, or the like. One example of a software development environment is described in more detail below with relation to FIG. 4.

In one embodiment, the system 100 includes a web service utility 108. The web service utility 108 may connect to the computer network 102 and may be configured to receive a web service identifier. Additionally, the web service utility 108 may establish communication with a web service 110 through the computer network 102. The web service utility 108 may be further configured to determine one or more functions provided by the web service 110, and automatically generate a reusable web service component 112 configured to receive an application request and return a result for a particular web service. Further embodiments of a web service utility 108 are described below with relation to FIG. 2 and FIG. 3.

In one embodiment, the reusable web service component 112 automatically generated by the web service utility 108 may be integrated into a software application using the software development environment 104. The reusable web service component 112 may be configured to accept input parameters from an application requesting use of a web service 110. The web service component 112 may generate web service commands in a format compatible with the web service 110. Additionally, the web service component 112 may invoke the web service 110 to perform a requested function. In one embodiment, the web service component 112 may receive a web service result from the requested function and covert the web service result into a format compatible with the application language. Additionally, the web service component 112 may assign the web service result to an output parameter for the requesting application.

The reusable web service component 112 may be generated, tested, maintained, and stored as a separate and independent software object. Alternatively, the reusable web service component 112 may require integration with a software application to operate. For example, the reusable web service component 112 may be a function, class, module, or object that interfaces with the main body of an application code.

The reusable web service component 112 may be invoked by the application code, require input and output arguments to interface with the application code, and the like. Alternatively, the reusable web service component 112 may operate independent of the application code. In such an example, the reusable web service component 112 may accept web service requests from the application and return web service results to the application, but operate distinctly and separately from the application.

The web service component reduces the time required for a developer to provide application access to a web service. Automatic generation of the web service component will provide the benefits of further reduced time and cost associated with developing the web service components and associated applications, as well as reducing the required technical skill required to develop an application that accesses web services.

Figure 2:
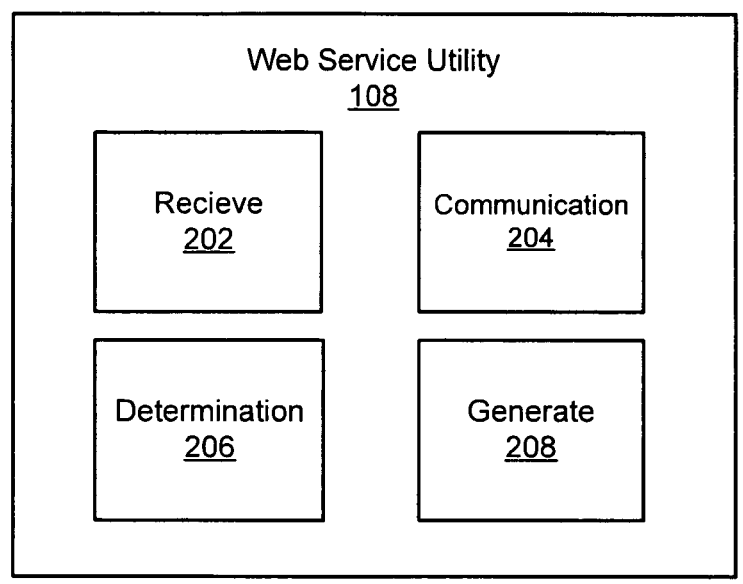
FIG. 2 is a schematic block diagram illustrating one embodiment of an apparatus for automatically generating a reusable software component for interfacing with a web service.

FIG. 2 illustrates one embodiment of a web service utility 108. In one embodiment, the web service utility 108 includes an apparatus comprising a plurality of modules configured to implement the operations to facilitate automatic generation of the reusable web service component 112. In one embodiment, the web service utility 108 may include a signal bearing medium comprising a program of machine-readable instructions executable by the modules of the web service utility 108 configured to carry out the operations of receiving a web service identifier, determining one or more functions provided by the web service 110, and automatically generate a reusable web service component 112 configured to receive an application request and return a web service result.

In one embodiment, the web service utility 108 includes a receive module 202 configured to receive a web service identifier. The identifier may include an address for a web service 110 such as a URL address, the name of a web service 110, a description of a web service, or a key word that can be associated with a web service 110. In one embodiment, the receive module 202 receives input from a user. The web service utility 108 may present a dialogue box for a user to type in the web service identifier such as a worldwide web URL. In certain embodiments, the receive module 202 may include electrical contacts configured to conduct instruction bearing signals, as well as buffers and other digital logic gates configured to process the received web service identifier.

In one embodiment, the communication module 204 is configured to establish communication with a web service 110. The communication module 204 may establish a communication link using HTTP through the internet. Alternatively, the communication module 204 may establish a direct peer to peer link with the server 106 hosting the web service 110, and transfer information about the web service 110 using File Transfer Protocol (FTP), or the like. In one embodiment, the information may include a user manual, port definition, instructions for interfacing, description of the service, or the like. Alternatively, the communication module 204 may send a request for the WSDL information to the web service 110. The communication module 204 may then send the WSDL information to the determination module 206 for further evaluation.

In one embodiment, the determination module 206 is configured to determine one or more functions provided by the web service 110. The determination module may utilize the WSDL information to evaluate the functions available. A function may include a sub-service feature or functionality provided by the web service 110. For example, the Amazon™ web service 110 may provide a book search function, a book information function, and a book ordering function. These functions may be accessible from the same address for the Amazon™ web service 110 with a different appended argument. In addition, the determination module 206 is configured to determine the interface of an identified web service 110. The determination module 206 may reference the WSDL information for argument names, data types, command formats, and the like. For example, the determination module 206 may determine the input and output arguments and associated data types required by the functions of the identified web service 110.

The generate module 208 automatically generates a reusable web service component 112 configured to receive an application request and return a web service result. The generate module 208 may include a set of instructions for processing the information collected by the determination module 206 and formatting the required input and output arguments into XML code according to the format required by the identified web service 110. The steps of collecting the information, processing the information, formatting the arguments, and generating the component code may be performed automatically and without interaction with a user. Alternatively, the steps may be performed automatically subsequent to a trigger from a user, for example to test the web service 110.

In one embodiment, the generation module 208 generates a set of instructions to convert argument data types, argument names, and command formats from those required by the application to those required by the web service 110. The instructions may be generated in the language of the application code, and configured to generate XML at run time to interface with the web service 110.

One example of a web service component 112 that may be generated by the web service utility 108 is a Google™ web service component 112. In such an example, a user may provide an identifier for the Google™ web service 110 for the receive module 202 in the form of a URL address. The communication module 206 may then establish communication with the Google™ web service 110 via HTTP through the Internet 102. The determination module 206 may then determine that the Google™ web service 110 includes three functions. Additionally, the determination module 206 may determine the arguments and associated data types for the three functions. Then the generate module 208 may automatically generate a reusable web service component 112 for one of the three Google™ web service functions as indicated by a user. In such an example, the web service component 112 may be compatible with a JAVA application. In one embodiment, the generate module 208 generates a reusable web service component 112 for each Google™ web service 110 function.

The example described above illustrates the advantages associated with using the web service utility 108. An application developer is not required to know how to write application source code to allow the application to access the Google™ web service 110. In addition, the web service utility 108 simplifies the process of developing the web service component by automatically generating the component.

Figure 3:
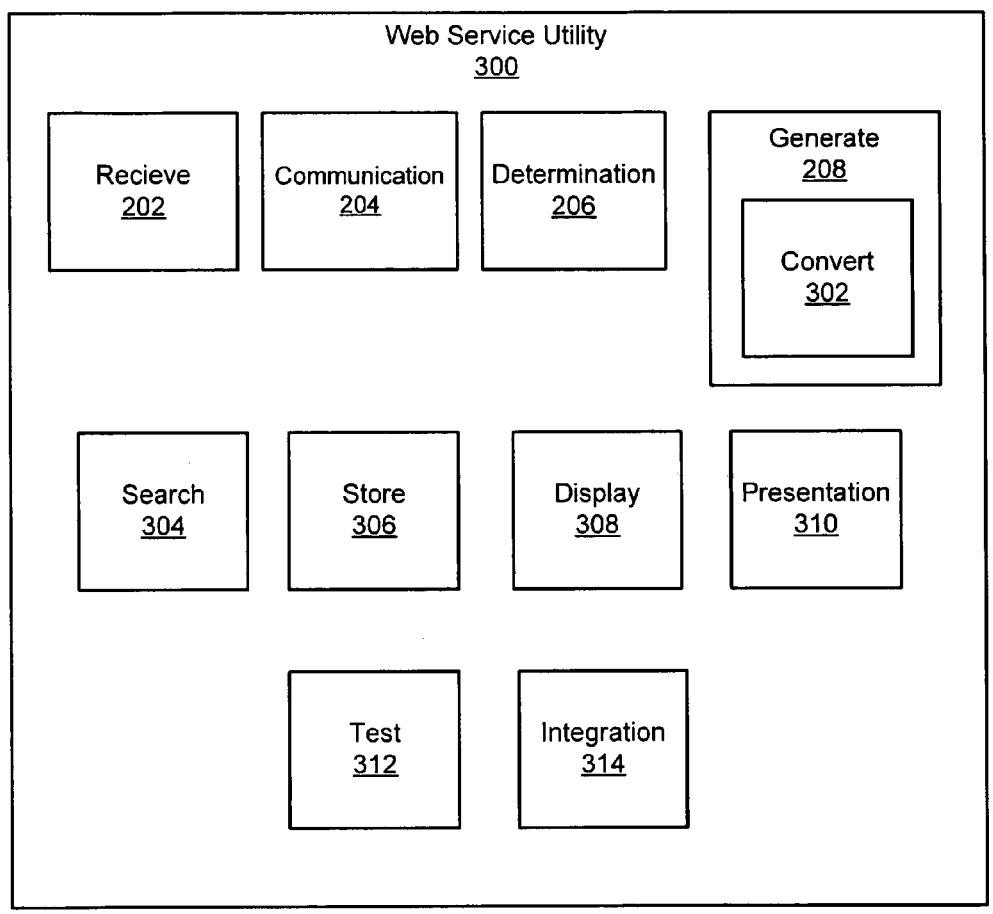
FIG. 3 is a detailed schematic block diagram illustrating one embodiment of an apparatus for automatically generating a reusable software component for interfacing with a web service.

FIG. 3 illustrates one embodiment of a web service utility 300. In one embodiment, the web service utility 300 comprises the receive module 202, communication module 204, determination module 206, and generate module 208 described above with relation to FIG. 2. Additionally, the web service utility 300 may further include modules to convert instruction formats, search for a web service 110, store a web service component 112 into a library of web service components 112, test a web service component 112, display a graphical development interface, and integrate a web service component 112 into an application. These modules include a convert module 302, a search module 304, a store module 306, a display module 308, a presentation module 310, a test module 312, and an integration module 314.

In one embodiment, the convert module 302 is configured to convert instructions between an application code language and XML. For example, the application code language may include JAVA. In such an example, the convert module 302 converts instructions or arguments between JAVA format and XML format. Such a data format conversion is required to allow the web service object 112 to interface with an application.

The convert module 302 may assigns input arguments from the JAVA code to XML formatted arguments at run time for the web service ports. Additionally, the convert module 302 converts the resulting messages from XML format back to JAVA format. Additionally, the convert module 302 may convert instructions for invoking the service or one of the subsets of services provided.

In one embodiment, the search module 304 is configured to search for a URL address for a web service identified by a user. If the receive module 202 does not receive a valid web service identifier such as a URL for the web service, the search module 304 may search for a valid web service identifier to allow the web service utility 300 to access the identified web service 110. In one embodiment, the search module 304 may search a UDDI registry of web services 110 for a valid URL associated with the web service search information provided by a user. Alternatively, the search module 304 may search an internet based search engine for a valid URL for the web service 110. The search module 304 may perform searches automatically. The search module 304 saves time in developing a web service component 112 by facilitating locating of a suitable web service.

In one embodiment, the store module 306 is configured to store the reusable web service component 112 in a library of selectable web service components 112 configured to integrate with application code. The store module 306 may be connected to a storage device such as a storage disk, memory, or the like. The store module 306 may store the web service component 112 in a library comprising a directory on the storage device. In certain embodiments, the library may be accessible by multiple applications and application development tools. In certain embodiments, the store module 306 registers the web service component 112 in a library registry and/or a software development environment 104. In this manner, the web service component 112 is readily usable by a developer.

In one embodiment, the library of selectable web service components 112 may be packaged along with an application development tool for distribution to customers purchasing the application development tool. The library and application development tool may be stored on a portable data storage device such as an optical storage disk for distribution. Alternatively, the library may be packaged separately and distributed as a pluggable accessory to various software application development tools.

In one embodiment, the display module 308 is configured to display a graphical development interface configured to facilitate mapping arguments of the reusable web service component 112 to arguments of the application code. Additionally, the display module 308 may display a tool for user interaction in generating and testing the web service component 112. The display module 308 may provide the user interface to the web service utility 108. In an alternative embodiment, the display module 308 may display a text based tool for development of web service components 112 and integration of the components 112 into application code. The graphical development interface may include a mapping window, an argument presentation window, a library menu, a testing window, a component build window, and the like. One example of a graphical development interface is described further with relation to FIG. 4.

In one embodiment, the presentation module 310 is configured to present required input values and resulting output values for the reusable web service component to a user. In one further embodiment, the presentation module 310 may present the data types required for the presented arguments. Alternatively, the presentation module 310 may present commands, protocols, functions, or the like to facilitate integration of the web service component with application code. Presentation of arguments may reduce the number of integration errors resulting from incorrect correlation of arguments and argument data types.

In one embodiment, the test module 312 is configured to test a reusable web service component 112. It is useful to test a web service component 112 prior to integrating the web service component 112 with an application to determine if the web service component 112 operates correctly, and to determine if the returned results are consistent with the expected return results. In one embodiment, the test module 312 provides an easy to use, predefined test harness compatible with the web service component 112 and the selected web service 110. The test module 312 may automatically generate the test harness when the generate module 208 generates the web service component 112.

In one embodiment, the integration module 314 is configured to integrate the reusable web service component 112 into application code. In one embodiment, the integration module 314 may use components of the graphical development interface displayed by the display module 308 to facilitate the integration. One example of an integration module is described further with relation to FIG. 4B.

Figure 4A:
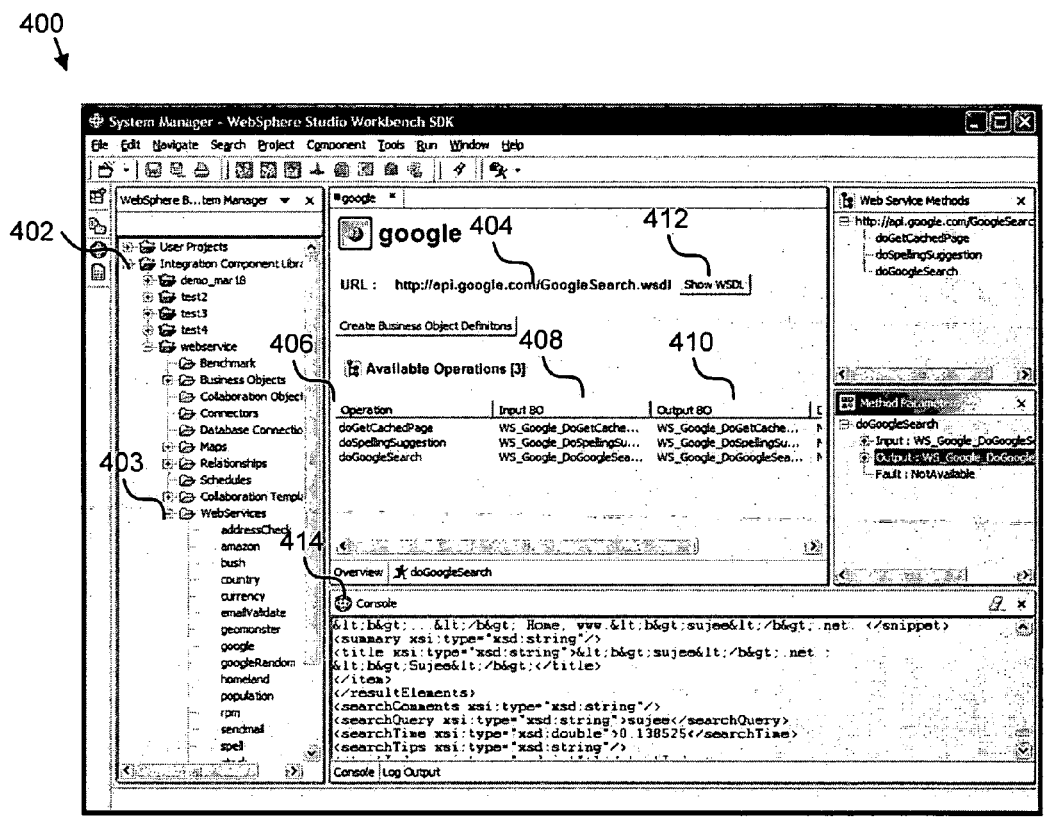
FIG. 4A is a screen capture of a software development tool for automatically generating a reusable web service component for interfacing with a web service in accordance with the present invention.

FIG. 4A is a screen capture of a software development tool 400 for automatically generating a reusable web service component 112 for interfacing with a web service 110. In various embodiments, the software development tool 104 may include user displays for accessing the modules of the web service utility 108. (see FIG. 1) In one embodiment, the tool 400 may include an integration component library 402 which includes a web service library menu 403 configured to display the reusable web service components 112 stored by the store module 306 in a library 402. In the screen capture depicted, the Google™ web service 110 has been selected for viewing. The viewing screen may include the identifier 404, the available functions 406 of the web service 110, and the associated arguments 408, 410 of the available functions 406. In addition, the tool 400 may include a button 412 which displays a window 414 for viewing the WSDL code for the web service 110.

In one embodiment, the modules and operations of the web service utility 108 may be available to a developer using drop-down menus on the tool 400. Alternatively, certain of these operations may run as background processes automatically.

Figure 4B:
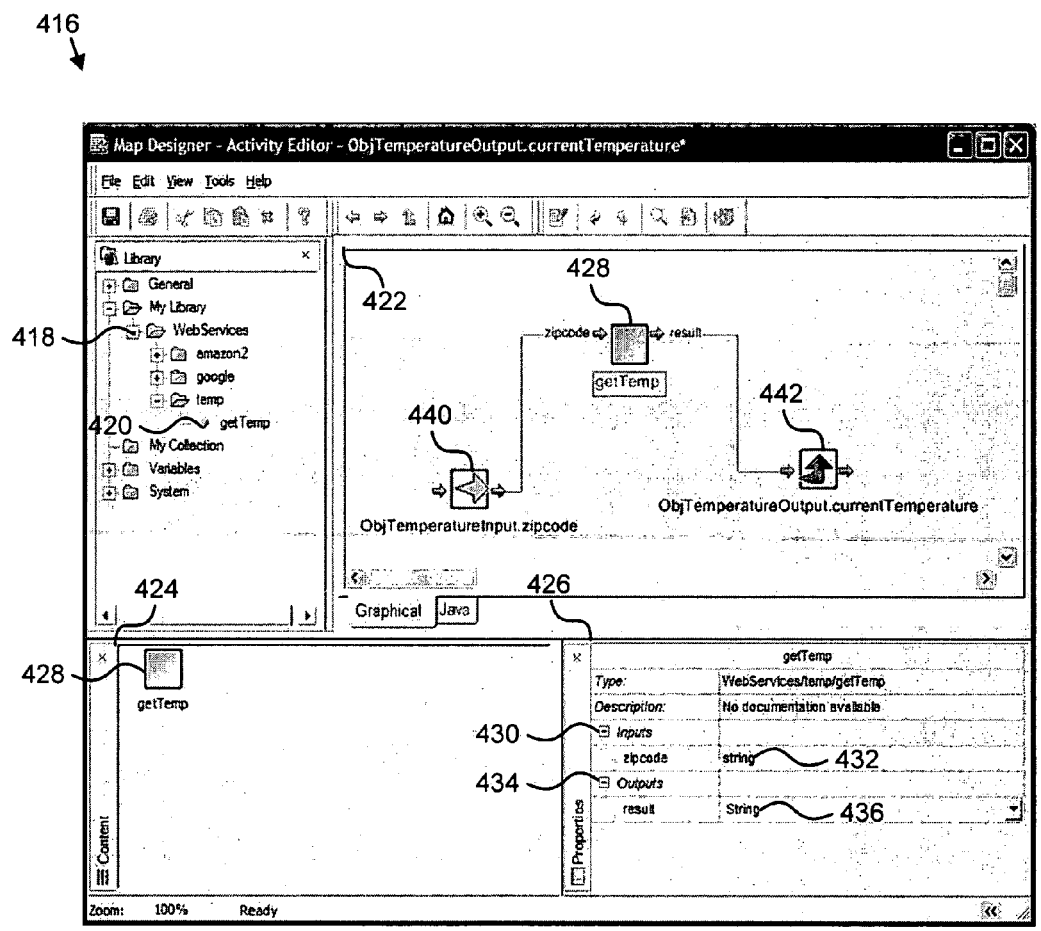
FIG. 4B is a screen capture of a software development tool for integrating a reusable web service component with application code.

FIG. 4B is a screen capture of a software development tool 416 for integrating a reusable web service component 112 with application code. In one embodiment, the integration tool 416 includes a library menu 418 for displaying the web service components 112 and the associated web service functions 420 available for integration into applications. Additionally, the tool 416 includes a mapping window 422, an icon list 424, and an argument presentation window 426.

In one embodiment, the icon list 424 includes a list of droppable icons 428 that can be dragged and dropped into the mapping window 422. The argument presentation window 426 presents a listing of the arguments and associated data types required for a selected web service function 428. For example, the argument presentation window 426 includes the inputs 430 and the associated data type 432, and the outputs 434 with the associated data types 436. This information is automatically defined in the web service component 112.

In addition, the web service function 428 can be mapped to input arguments 440 and output arguments 442 of the application code. The argument information presented in the argument presentation window 426 assists an application developer with properly mapping the arguments and associated argument data types.

The example illustrated in FIG. 4B is helpful for further understanding the details of integrating a web service component 112 with an application. In this example, a web service 110 for retrieving a temperature for a particular geographic region defined by a zip code is identified. The getTemp web service component is automatically generated using the generating tool 400. Then the web service component 112 is accessed using the library menu 418. When the getTemp function 420 is selected, the icon 428 appears in the icon list window 424. The developer may then drag the getTemp icon 428 to the mapping window 422. When the icon 428 is selected, the arguments 430, 434 are displayed in the argument display window 426. Then, using the argument information 430, 434 and associated data type information 432, 436 the application developer may map application arguments 440, 442 to the arguments of the web service function 428. Alternatively, the tool 416 may map the arguments 440, 442 of the application code to arguments of the web service component 428 based on matching data types.

Figure 5:
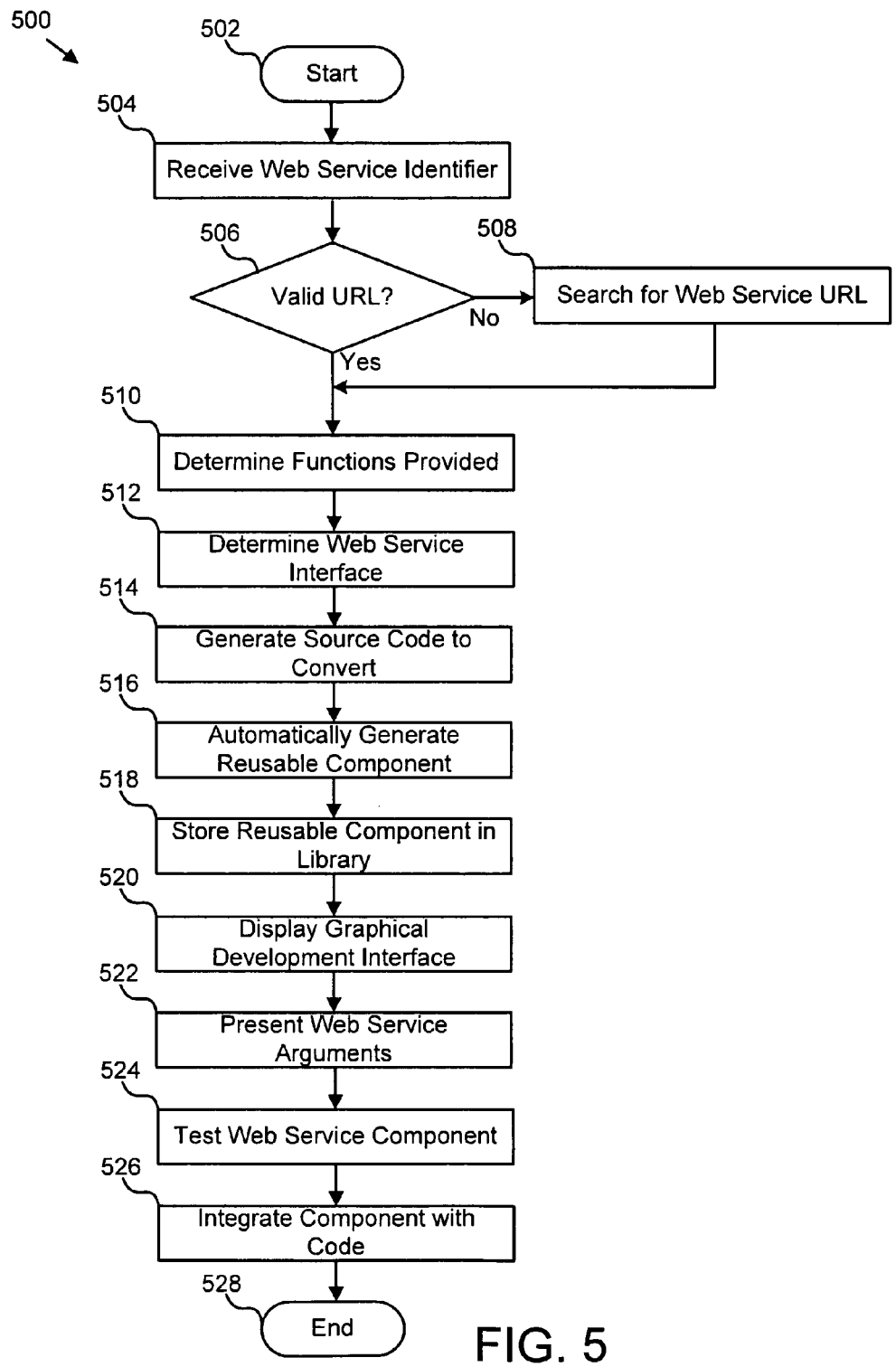
FIG. 5 is a schematic flow chart diagram illustrating one embodiment of a method for automatically generating a reusable software component for interfacing with a web service.

FIG. 5 illustrates one embodiment of a method 500 for automatically generating a reusable software component 112 for interfacing with a web service 110. In one embodiment, the method 500 starts 502 when the receive module 202 receives 504 a web service identifier. The receive module 202 determines 506 if the web service identifier is valid. If so, the determination module 206 determines 510 the functions provided by the web service 110. If not, the search module 304 searches 508 for a valid URL for the web service 110. In certain embodiments, a user may give input to select a valid URL from a list of URLs returned by a search 508. Then the determination module 206 determines 510 the functions provided by the web service 110. Specifically, the determination module 206 retrieves the WSDL for the web service.

Next, the determination module 206 determines 512 the web service interface including arguments and data types of the web service functions available. The convert module 302 generates source code to convert 514 the arguments into a format and datatype compatible with application code. The generate module 208 then automatically generates 516 the reusable web service component 112. The store module 306 may then store 518 the reusable web service component 112 in a library of web service components 112.

The display module 308 may display 520 a graphical development interface such as the interfaces described in FIGS. 4A and 4B. The presentation module 310 may present 522 the web service arguments 430, 434 for a web service function selected by a developer. The web service component 112 may then be tested 524 by the test module 312 using test data from a user. The integration module 314 may then integrate 526 the web service component 112 with application source code and the method 500 ends 528.

Figure 6:
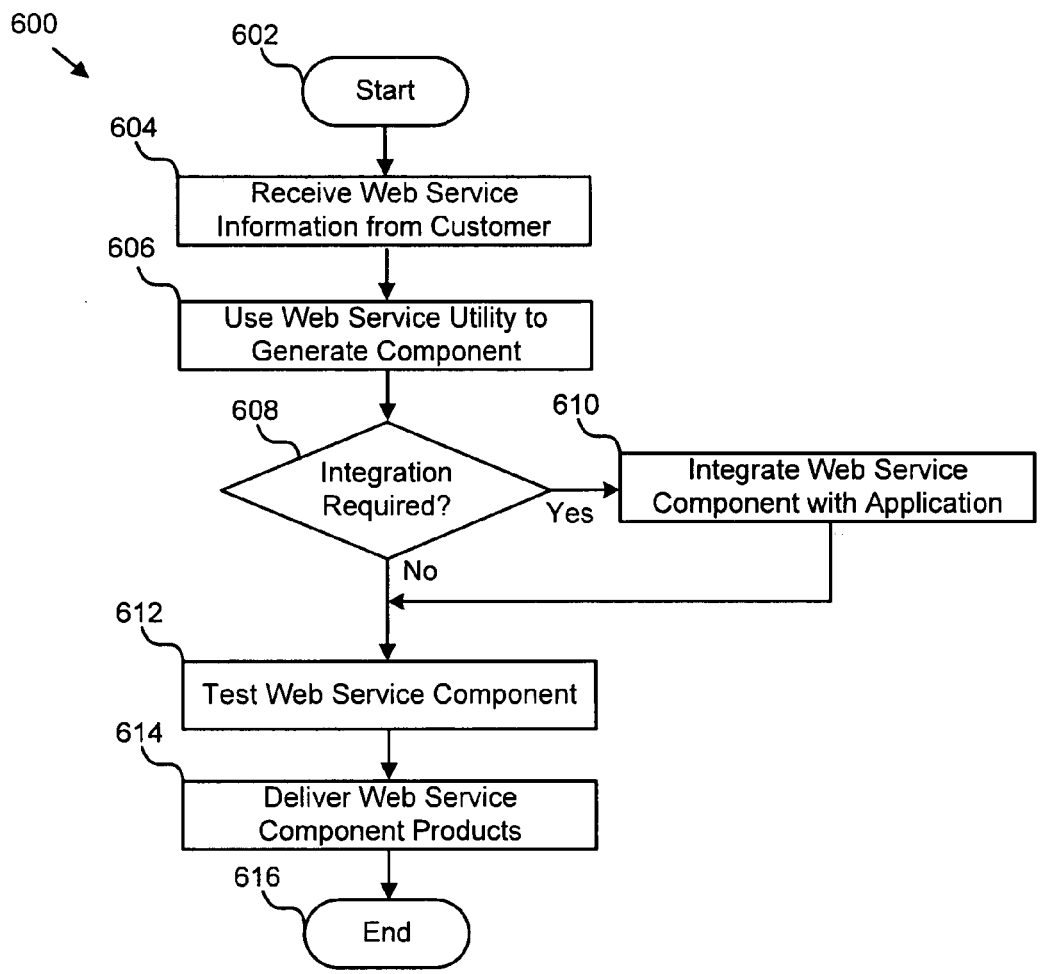
FIG. 6 is a schematic flow chart diagram illustrating one embodiment of a method for automatically generating a reusable web service interface component for a customer.

FIG. 6 illustrates one embodiment of a method 600 for automatically generating a reusable web service interface component for a customer. In one embodiment, the method 600 starts 602 by receiving 604 web service information from a customer. The web service information may include a web service identifier, and an application code language identifier and function. Then, the web service utility 108 is used 606 to automatically generate a reusable web service component 112. The steps of automatically generating the web service component 112 may substantially include those describe with relation to FIG. 5.

If the customer requires 608 integration of the web service component 112 with an application, then the web service component 112 is integrated 610 with the application code. If the integration is not required 608 or if the component 112 has been integrated 610, then the web service component 112 or application code with integrated web service component 112 is tested 612. Of course, the web service component 112 may be tested 612 before integration is determined 608. Then, the web service component products are delivered 614 to the customer, and the method 600 ends. In one embodiment, the web service component products include a reusable web service component 112, an application code with an integrated web service component 112, and a library of selectable web service components 112.

The web service utility 108, and associated system, method, and method for providing a service provide the benefits of quick and efficient generation of portable and pluggable web service components 112. In addition, the automation reduces the time and technical skills required to develop the web service component 112.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising:
a non-transitory computer readable storage medium storing computer readable program code executable by a processor, the computer readable program code performing:
receiving a web service identifier of a web service from an application requesting use of the web service;

searching for a Universal Resource Locator (URL) for the web service in response to the web service identifier lacking a valid URL for the web service;

accepting input parameters as application code of a programming language of the application;

determining one or more functions provided by the web service corresponding to the web service identifier;

generating a reusable web service component based on the one or more functions and the input parameters, the reusable web service component comprising computer readable instructions to integrate with the application;

invoking the web service using the reusable web service component to perform a requested function;

receiving a web service result from the requested function of the one or more functions;

converting the web service result into application code of the programming language of the application; and assigning the web service result to an output parameter in application code of the programming language of the application.

2. The computer program product of claim 1, wherein determining the one or more functions further comprises determining an interface of the web service.

3. The computer program product of claim 1, wherein the computer readable program code further visually presents required input parameters and resulting output parameters for the reusable web service component.

4. The computer program product of claim 3, wherein the computer readable program code further visually presents required input values and resulting output values for the reusable web service component in response to an operation to test the reusable web service component.

5. The computer program product of claim 1, wherein the computer readable program code further integrates the reusable web service component into application source code.

6. The computer program product of claim 1, wherein the programming language of the application comprises JAVA and wherein the web reusable web service component is configured to convert instructions between JAVA and Extensible Markup Language (XML).

7. The computer program product of claim 1, wherein the computer readable program code further stores the generated reusable web service component as an independent software object in a library of selectable reusable web service components configured to integrate with application source code of one or more applications.

8. The computer program product of claim 1, wherein the computer readable program code further graphically displays a representation of the reusable web service component in a graphical development interface, wherein each reusable web service component of the library is independently selected in the graphical development interface to facilitate mapping arguments of the reusable web service component to arguments of the application source code.

9. An apparatus comprising:
a non-transitory computer readable storage medium storing computer readable program code executable by a processor, the computer readable program code performing:
receiving a web service identifier of a web service from an application requesting use of the web service;
searching for a Universal Resource Locator (URL) for the web service in response to the web service identifier lacking a valid URL for the web service;
accepting input parameters as application code of a programming language of the application;
determining one or more functions provided by the web service corresponding to the web service identifier;
generating a reusable web service component based on the one or more functions and the input parameters, the reusable web service component comprising computer readable instructions to integrate with the application;
invoking the web service using the reusable web service component to perform a requested function;
receiving a web service result from the requested function, of the one or more functions;
converting the web service result into application code of the programming language of the application; and
assigning the web service result to an output parameter in application code of the programming language of the application.

10. A system comprising:
a computer network configured to provide data communication between a web service server and a web service utility;
a server connected to the computer network and configured to host a web service; and
a processor connected to the computer network;
a non-transitory computer readable storage medium storing computer readable program code executable by the processor, the computer readable program code performing:
receiving a web service identifier of a web service from an application requesting use of the web service;
searching for a Universal Resource Locator (URL) for the web service in response to the web service identifier lacking a valid URL for the web service;
accepting input parameters as application code of a programming language of the application;
determining one or more functions provided by the web service corresponding to the web service identifier;
generating a reusable web service component based on the one or more functions and the input parameters, the reusable web service component comprising computer readable instructions to integrate with the application;
invoking the web service using the reusable web service component to perform a requested function;
receiving a web service result from the requested function of the one or more functions;
converting the web service result into application code of the programming language of the application; and
assigning the web service result to an output parameter in application code of the programming language of the application.

11. The system of claim 10, wherein the web service utility further determines an interface of the web service.

12. The system of claim 10, wherein the web service utility further presents required input parameters and resulting output parameters for the reusable web service component.

13. The system of claim 12, wherein the web service utility further
presents required input values and resulting output values for the reusable web service component in response to a test of the reusable web service component.

14. A method comprising:
receiving, by use of a processor, a web service identifier of a web service from an application requesting use of the web service;
searching for a Universal Resource Locator (URL) for the web service in response to the web service identifier lacking a valid URL for the web service;
accepting input parameters as application code of a programming language of the application;

determining one or more functions provided by the web service corresponding to the web service identifier;

generating a reusable web service component based on the one or more functions and the input parameters, the reusable web service component comprising computer readable instructions to integrate with the application;

invoking the web service using the reusable web service component to perform a requested function;

receiving a web service result from the requested function of the one or more functions;

converting the web service result into application code of the programming language of the application; and assigning the web service result to an output parameter in application code of the programming language of the application.

15. The method of claim 14, wherein determining further comprises determining a command structure and a protocol of an identified web service.

16. The method of claim 14, wherein the method further comprises testing the reusable web service source code component.

17. The method of claim 14, wherein the method further comprises integrating the reusable web service source code component into application source code.

18. The method of claim 14, further comprising:

presenting required input values and resulting output values for the reusable web service component in response to an operation to test the reusable web service component.

19. The method of claim 14, further comprising storing the generated reusable web service component as an independent software object in a library of selectable reusable web service components configured to integrate with application source code of one or more applications.

* * * * *